Fig. 4.

UNITED STATES PATENT OFFICE 2,340,350

MECHANISM FOR USE IN COMPUTING APPARATUS

Antonin Svoboda, Forest Hills, N. Y., assignor to Abax Corporation, New York, N. Y., a corporation of New York Application March 22, 1943, Serial No. 480,128

13 Claims. (Cl. 235—61)

This invention relates to a mechanism for use in computing apparatus and provides a simple linkage mechanism of inexpensive construction which may be substituted for logarithmic and exponential cams in ballistic and other computing apparatus. The mechanism constitutes an improvement in the linkage for the same purpose disclosed in my co-pending application Serial No. 448,135, filed June 23, 1942, on which Patent No. 2,328,306 was issued on August 31, 1943.

The linkage described in my aforesaid application had only three moving parts. The linkage which I have now invented has five moving parts and possesses a much wider useful range than the three part linkage described in my aforesaid application. The present linkage determines logarithms with substantially the same accuracy as that shown in my aforesaid application and has a useful range nearly equal to the square of the useful range of my former linkage.

The mechanism which I have invented consists of three swinging members pivoted separately on fixed pivot points and two links each connecting two of the swinging members. The length of each link and the distances from its ends to the fixed pivot points of the two swinging members which it connects bear critical relationships to the distances between these fixed pivots, while the angle between the line connecting the first and second fixed pivot points and the line connecting the second and third fixed pivot points bears a critical relation to the angle between lines connecting the ends of the links attached to the intermediate swinging member with the fixed pivot of this member. These critical relationships are such that over a substantial range the swinging movement of the third swinging member is proportional to the logarithm of the swinging movement of the first swinging member.

In order to make the nature of my invention clear I will state the critical relationships referred to and describe the number of different mechanisms incorporating it. In this description I shall refer to the accompanying drawings in which.

Figures 1, 6:
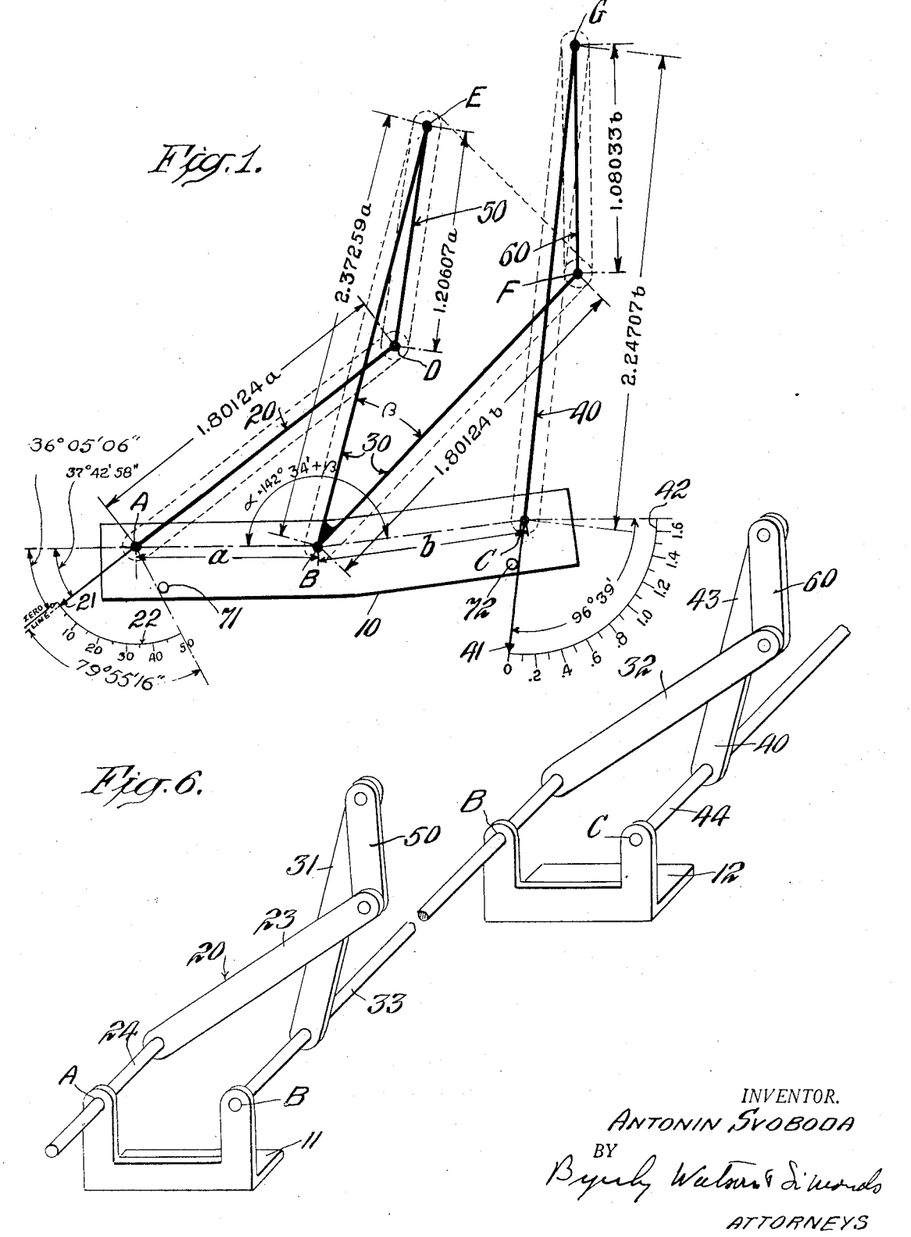
Fig. 1 is a diagram showing the critical relationship of the parts of the mechanism.
Fig. 6 is a perspective view of the mechanism shown in Fig. 2 indicating a convenient form of construction.

Fig. 1 shows the general arrangement of the mechanism and indicates that it includes three pivoted or swinging members 20, 30, 40 pivoted to a fixed support 10 at three pivot points A, B, C. A link 50 connects the free end D of the member 20 to a point E of the member 30 and another link 60 connects a point F of the member 30 to the free end G of the member 40. In order to make clear the dimensional relationships, the swinging members and links are indicated by heavy lines joining the various pivots and connecting points. The shape of mechanical parts constituting the swinging members and links is of minor importance and may be that indicated in dotted lines in Fig. 1.

The length D—E of the link 50 and the distances of its ends D, E from the fixed pivots A, B on which the two swinging members 20, 30 which it connects are pivoted, bear critical relationships to the distance between these two fixed pivots A, B. These are indicated in Fig. 1 and are as follows:

| | |
|---|---|
| Distance between fixed pivots A, B | $a$ |
| Length of link 50 (D—E) | $1.20607a$ |
| Distance A—D | $1.80124a$ |
| Distance B—E | $2.37259a$ |

The length F—G of link 60 and the distances of its ends F, G from the fixed pivots B, C, on which the two swinging members 30, 40 which it connects are pivoted, bear critical relationships to the distance between these two fixed pivots B, C. These are indicated in Fig. 1 and are as follows:

| | |
|---|---|
| Distance between fixed pivots B, C | $b$ |
| Length of link 60 (F—G) | $1.08033b$ |
| Distance B—F | $1.80124b$ |
| Distance C—G | $2.24707b$ |

It should be understood that the lengths and distances referred to throughout this specification and in the claims which follow are in all cases measured between pivot points.

The angle $\alpha$ between the line AB connecting the fixed pivots of the first and second swinging members and line BC connecting the fixed pivots of the second and third swinging members bears a critical relationship to the angle $\beta$ between the lines BE and BF connecting the fixed pivot B of the intermediate swinging member with the ends of the two links which are pivoted to it. This critical relationship is indicated in Fig. 1 and is as follows:

$$\alpha - \beta = 142° \ 34'$$

When the device is constructed in accordance with these critical relationships it will be found that the swinging movement of the third swinging member 40 is proportional to the logarithm of the swinging movement of the first swinging member 20, or conversely, that the swinging movement of the member 20 bears an exponential relationship to the swinging movement of the member 40. To illustrate this the members 20, 40, as shown in Fig. 1, are provided with pointers 21, 41 moving over scales 22, 42. To obtain the logarithmic relationship, movements of the member 20 must be measured from a zero line which is at an angle of 36° 05′ 06″ to the line AB connecting the fixed pivots A, B and which is indicated in Fig. 1 as "zero line." An accurate logarithmic relationship between the movements of the members 20, 40 is obtained only over a limited range of movement. As shown in Fig. 1, this is a range of 79° 55′ 16″ for the member 20 extending from the position at which the line AD of this member is at an angle of 37° 42′ 58″ to the line AB. The operation of the mechanism is limited to this range of movement by stops which may be arranged in numerous different ways. Fig. 1 shows two stops 71, 72 of which the stop 71 engages the member 20 when it is at the right hand end of the arcuate movement above specified, while stop 72 engages the swinging member 40 when the member 20 is at the other end of this limited movement.

To illustrate the operation of the device, the scale 22 is graduated in equal arcuate distances from the zero line, and the end of the limited swinging movement of the member 20 which is nearest the zero line is marked as one unit on the scale. The unit of this scale is, therefore, the difference between 37° 42′ 58″ and 36° 05′ 06″ or 1° 37′ 52″. The scale 42 has its zero point at the position which the pointer 41 of the member 40 occupies when the pointer 21 of the member 20 is at the "1.0" point of the scale 22. The scale is uniformly graduated, the unit being equal to 56° 53′ 28″ which places the "1.0" of the scale at the position which the pointer 41 takes when the pointer 21 is at "10" on the scale 22. It will be found that throughout the operation of the mechanism within the limits provided by the stops 71, 72, the reading of the pointer 41 on the scale 42 will always be the logarithm of the reading of the pointer 21 on the scale 22, subject to a slight error hereinafter mentioned. The logarithmic relationship will be apparent from an examination of Fig. 4 hereinafter mentioned.

The useful range of the apparatus is from 1 to 50, that is to say, it may be used to determine the logarithms of all numbers from 1 to 50. The reason for this is that the arcuate movement of the member 20 over which the logarithmic relationship holds is 50 times the arcuate distance of the end of the permitted movement from the zero line. By reference to my earlier application before mentioned, it will be seen that in the case of the three-part linkage there described the arcuate movement of the arm representing numbers over which the logarithmic relationship was maintained is only 8 times the distance between the beginning of this movement and the zero line, so that the three-part device was capable of indicating logarithms of numbers only in the range from 1 to 8. By my present invention the range has been increased to from 1 to 50.

The present device gives logarithms over this much longer range with substantially the same accuracy as my former device over its shorter range. The maximum error of the device in the range of movement permitted by the stops 71, 72, measured on the logarithmic scale 42 is ±0.002 of the total permitted angular movement of the swinging member 40, which amounts to an error of not over 0.003 on the scale 42 as shown in Fig. 1. The error is fairly evenly distributed along the scale 42.

If the linkage were used outside the limits imposed by the stops 71, 72, the error would increase rapidly beyond the stop 72 (that is, to the left of the "1" point on the scale 22) and would soon become so great that the relation between the angular movements of the members 20, 40 would no longer be recognized as approximating a logarithmic relation. The error increases less rapidly beyond the limit imposed by the stop 71 (that is, to the right of the "50" point on the scale 22) and a roughly approximate logarithmic relationship is maintained over the next 20° of swing beyond the swing permitted by the stop 71, so that the stop 71 may be moved to permit extending the scale 22 to "64" where only roughly approximate results are required.

Figure 5:
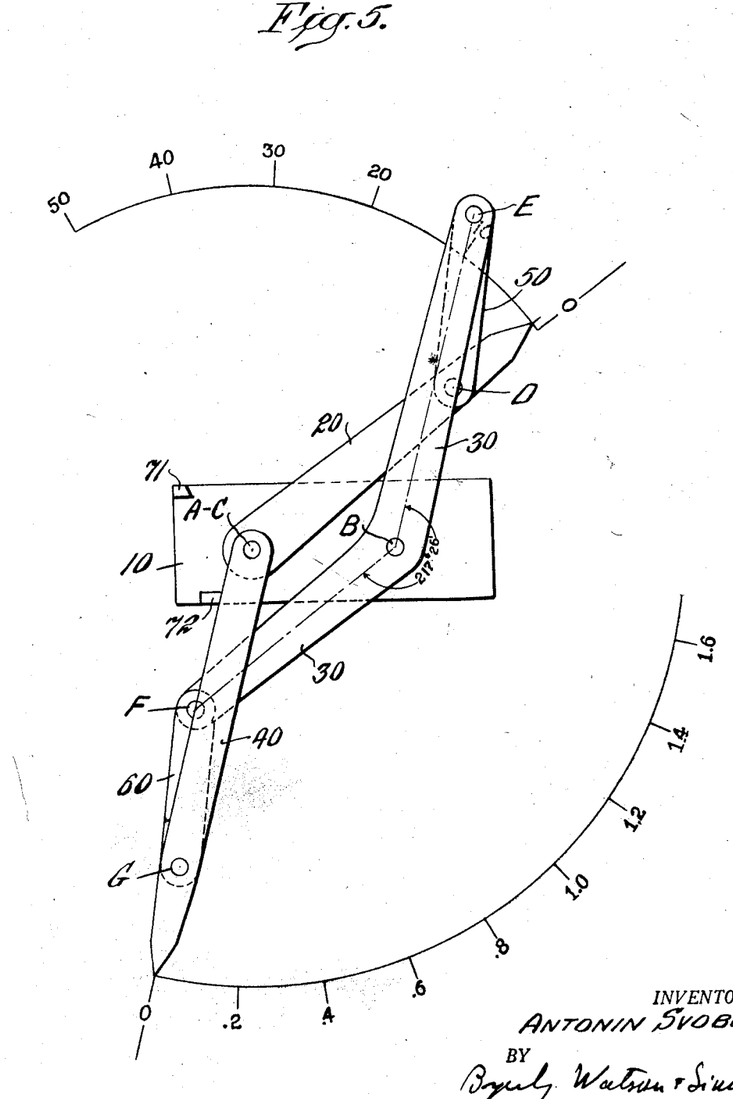

The small error above specified is inherent in the mechanism and occurs even when the dimensions are exactly equal to the critical values given. Any departure from the critical relative proportions introduces further errors, so that to obtain the best possible results the relative dimensions of the linkage should be accurate to the same degree as the best results which can be obtained from the apparatus, that is to say, that should be accurate within 0.00075. In cases where such great accuracy is not required, the relative dimensions may depart somewhat from the critical values given. Thus, for an accuracy within 0.02 on the logarithmic scale (that is the smallest division of this scale shown in Fig. 1) the following tolerances may be allowed in the relative dimensions of the parts of the linkage, the dimensions being given as above, as ratios to the distances $a$, $b$ between the fixed pivots:

Distance D—E $(1.21 \pm 0.05)a$
Distance A—D $(1.80 \pm 0.07)a$
Distance B—E $(2.37 \pm 0.09)a$
Distance F—G $(1.08 \pm 0.04)b$
Distance B—F $(1.80 \pm 0.07)b$
Distance C—G $(2.25 \pm 0.09)b$
Angle $\alpha - \beta = 142° 34′ \pm 10′$ An advantage of the present mechanism is that it may be constructed in a number of different convenient forms. This is because the critical relationships upon which the operation of the mechanism depends do not place any limitation on the ratio between the distance $a$ between the fixed pivots A, B, and the distance $b$ between the fixed pivots B, C, nor any limitation on the absolute values of the angle $\alpha$ between the lines AB and BC or the angle $\beta$ between the lines BE and BF provided that the required difference between these angles is maintained. A number of different desirable forms for the apparatus are shown in Figs. 2, 3, 5.

Figure 2:
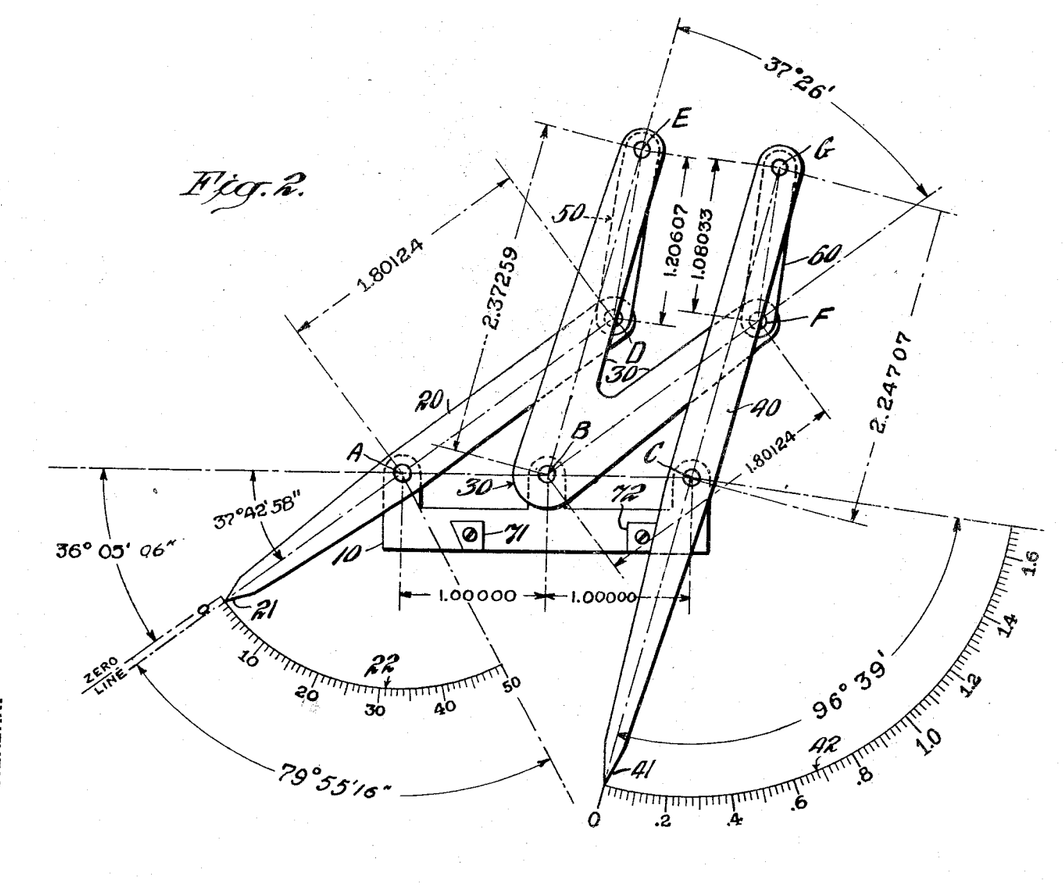
Figs. 2, 3 and 5 are diagrams showing different specific forms which the mechanism may take.

In the form shown in Fig. 2, the fixed pivots A, B and C are equally spaced along a straight line. This makes the angle $\alpha$ equal to 180°, so that the angle $\beta$ must be 37° 26′, and also makes the distances $a$ and $b$ equal. If each of these distances be taken as equal to unity, the critical dimensions of this form of the apparatus become:

| | |
|---|---|
| Distance between fixed pivots A, B | 1.00000 |
| Distance between fixed pivots B, C | 1.00000 |
| Length of link 50 (D—E) | 1.20607 |
| Distance A—D | 1.80124 |
| Distance B—E | 2.37259 |
| Distance between fixed pivots B, C | 1.00000 |
| Length of link 60 (F—G) | 1.08033 |
| Distance B—F | 1.80124 |
| Distance C—G | 2.24707 |

Figure 3:
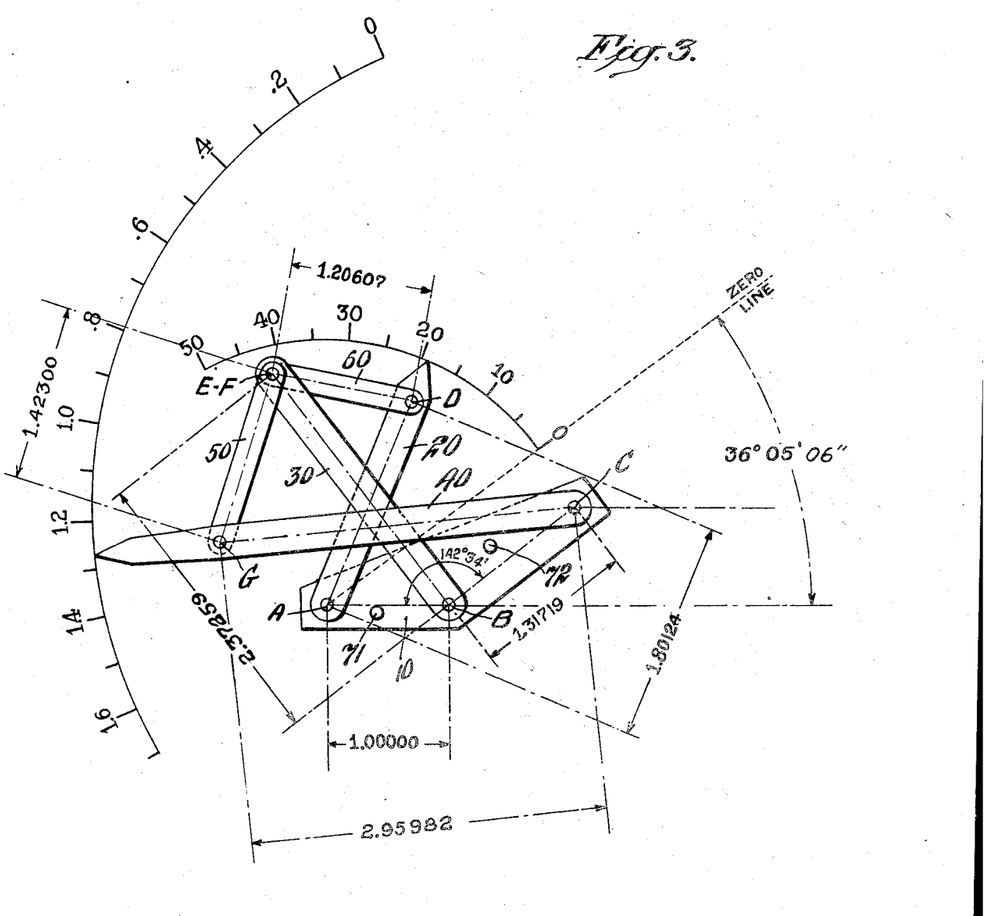

Fig. 3 indicates what I believe to be the most convenient and best form for constructing the apparatus. In this case the links 50 and 60 are pivoted to the intermediate swinging member 30 at the same point, that is to say, the points E and F are coincident as are also the lines BE and BF, so that the angle β is equal to zero. To preserve the critical relationship between the angles α and β before stated, this requires making the angle α equal to 142° 34'. It will be seen that in the construction shown in Fig. 3 the angle between the line AB connecting the fixed pivots A, B and the line BC connecting the fixed pivots B, C is equal to 142° 34'. It is also necessary to place the pivot C at a greater distance from the pivot B than the distance between the pivot B and the pivot A in order that the distance from the pivot B to the single pivot E, F may be equal both to 2.37259a and 1.80124b. This means that the distance B—C or b must be 1.31719 times the distance A—B or a. If the distance a between the pivots A and B be taken as unity, the critical dimensions of this form of the mechanism become:

| | |
|---|---|
| Distance between fixed pivots A, B | 1.00000 |
| Length of link 60 (D—E) | 1.20607 |
| Distance A—D | 1.80124 |
| Length of member 30 (B—E, F) | 2.37259 |
| Distance between fixed pivots B, C | 1.31719 |
| Length of link 50 (F—G) | 1.42300 |
| Distance C—G | 2.95982 |

Figure 4:
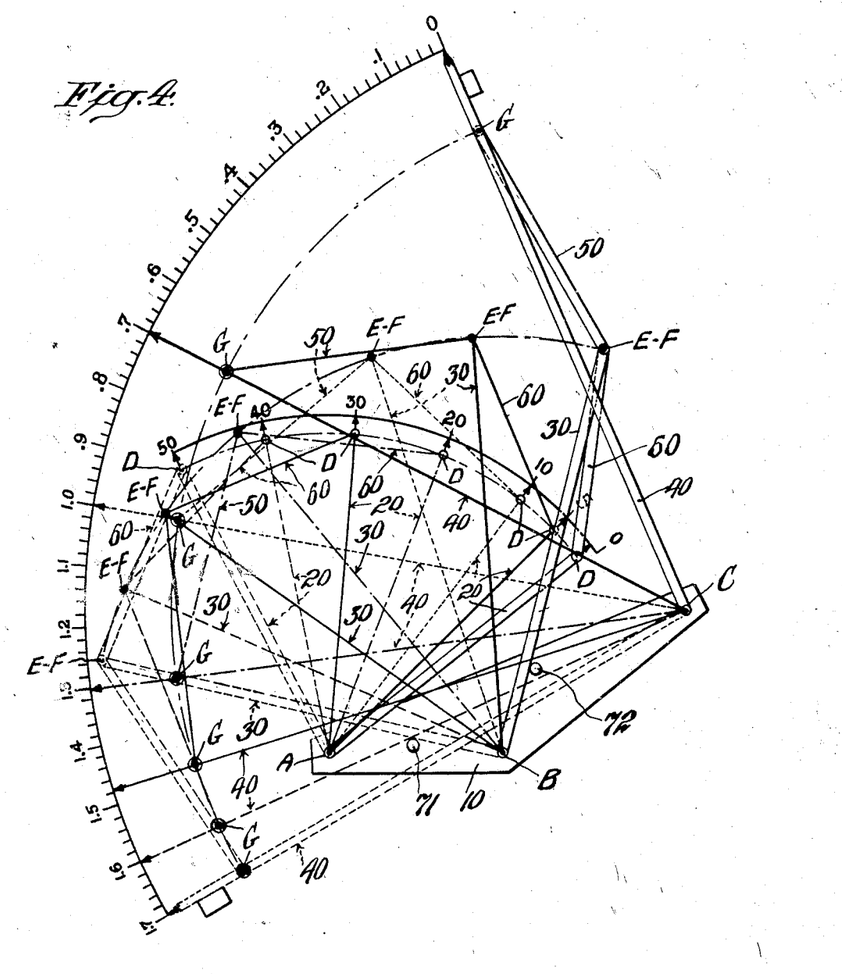
Fig. 4 is a diagram showing the number of different positions of the parts of the mechanism shown in Fig. 3.

Fig. 4 is a diagram of the mechanism shown in Fig. 3 indicating a considerable number of different positions which the parts of the apparatus take in use. From this figure the logarithmic operation of the apparatus is plainly apparent.

Another convenient construction is shown in Fig. 5. In this case the first and third swinging members 20 and 40 are mounted on a common fixed pivot A, C, so that the angle α is equal to 360°. It is, therefore, necessary to make the angle β equal to 217° 26' which gives the intermediate swinging member 30 the form of a bell crank lever, as shown in Fig. 5. This construction resembles that of Fig. 2 in that a=b since both of them are equal to the distance between the two fixed pivots of the device. Taking this distance as unity, the critical dimensions of the parts of the mechanism shown in Fig. 5 are the same as those previously stated in connection with Fig. 2.

As previously explained, the scales shown on the various figures which have been described have been introduced merely to explain the operation of the apparatus. In actual use of the apparatus in a computing device these scales are ordinarily omitted and the swinging members of the apparatus may consist of arms fixed on parallel shafts whose bearings or journals constitute the fixed pivots.

A form of construction which is convenient in some cases is shown in Fig. 6. The fixed pivots A, B and C take the form of bearings on a fixed framework including the parts 11 and 12. The swinging member 20 consists of an arm 23 fixed on a shaft 24 journalled in the bearing A, and the swinging member 40 consists of an arm 43 fixed on a shaft 44 journalled in the bearing C. The intermediate swinging member is constructed of two arms 31, 32 fixed on a shaft 33 journalled in the bearings B. Shaft 24 may be used as the input shaft in order to give the shaft 44 a turning movement proportional to the logarithm of the turning movement of the shaft 24, or conversely, shaft 44 may be used as the input shaft to give the shaft 24 a turning movement which is an exponential function of the turning of the shaft 44. The stops for limiting the swinging of the swinging members to the operative range may be incorporated in mechanism connected to the shaft 24 or the shaft 44 instead of directly engaging one of the swinging members of the mechanism.

Various uses which may be made of my new mechanism will be immediately apparent to those concerned with ballistic computers. The mechanism may, for example, be used as part of a multiplying device such as that shown in Fig. 2 of my former application. In fact, the range of the multiplying device there shown may be greatly extended by substituting my new five-part mechanism for the linkage 13, while retaining the two three-part linkages L1 and L2. This will permit using these two three-part linkages through nearly their full ranges in such a multiplying machine as the useful range of my five-part mechanism is nearly equal to the product of the ranges of two of the three-part linkages.

What I claim is:

Generic claims

1. A mechanism for use in computing apparatus consisting of a support, three swinging members of unequal lengths pivoted to the support and two links of unequal lengths one connecting the first member to an intermediate member and one connecting the intermediate member to the third member in which the length of each link and the distances from its ends to the pivots of the two swinging members which it connects bear such relationships to the distances between these pivots, and the angle between a line connecting the pivots of the first and intermediate swinging members and a line connecting the pivots of the intermediate and third swinging members bear such relationship to the angle between lines connecting the pivot of the intermediate swinging member with the ends of the two links which are attached to this swinging member, that the angular distance of the third swinging member from a fixed point closely approximates the logarithm of the angular distance of the first member from a given zero point over a substantial range of movement, and means for limiting the operation of the mechanism to this range of movement.

2. A mechanism for use in computing apparatus consisting of a support, three swinging members of unequal lengths pivoted on the support, a single link forming the sole connection other than the support between the first swinging member and the intermediate swinging member, and a single link of a different length forming the sole connection other than the support between the intermediate swinging member and the third swinging member, in which the length of the first link and the distances from its ends to the piv- ots of the two swinging members which it connects bear such relationships to the distance between these pivots, the length of the second link and the distance from its ends to the pivots of the two swinging members which it connects bear such relationships to the distance between these pivots, and the angle between a line connecting the pivots of the first and intermediate swinging members and a line connecting the pivots of the intermediate and third swinging members bear such relationship to the angle between lines connecting the pivot of the intermediate swinging member with the ends of the two links which are attached to this swinging member that the angular distance of the third swinging member from a fixed point closely approximates the logarithm of the angular distance of the first member from a given zero point over a substantial range of movement, and means for limiting the operation of the mechanism to this range of movement.

3. A mechanism for use in computing apparatus consisting of a support, three members pivoted on the support, a link connecting the first swinging member with the intermediate swinging member, and a link connecting the intermediate swinging member with the third swinging member, in which the length of the first link and the distances from its ends to the pivots of the two swinging members which it connects bear the following critical relationships to the distance between these pivots:

| | |
|---|---|
| Distance between pivots of first swinging member and intermediate swinging member | $a$ |
| Length of link connecting first swinging member to intermediate swinging member | $(1.21 \pm 0.05)\,a$ |
| Distance from the end of this link which is attached to first swinging member to pivot of this swinging member | $(1.80 \pm 0.07)\,a$ |
| Distance from other end of this link to pivot of intermediate swinging member | $(2.37 \pm 0.09)\,a$ | the length of the second link and the distances from its ends to the pivots of the two swinging members which it connects bear the following critical relationships to the distance between these pivots:

| | |
|---|---|
| Distance between pivots of intermediate swinging member and third swinging member | $b$ |
| Length of link connecting intermediate swinging member to third swinging member | $(1.08 \pm 0.04)\,b$ |
| Distance from the end of this link which is attached to intermediate swinging member to pivot of this swinging member | $(1.80 \pm 0.07)\,b$ |
| Distance from other end of this link to pivot of third swinging member | $(2.25 \pm 0.09)\,b$ | and the angle between a line connecting the pivots of the first and intermediate swinging members and a line connecting the pivots of the intermediate and third swinging members is equal to 142° 34′ ±10′ plus the angle between the lines connecting the pivot of the intermediate swinging member with the ends of the two links which are pivoted to this swinging member.

4. A mechanism for use in computing apparatus consisting of a support, three swinging members pivoted on the support, a link connecting the first swinging member with the intermediate swinging member, and a link connecting the intermediate swinging member with the third swinging member, in which the length of the first link and the distances from its ends to the pivots of the two swinging members which it connects bear substantially the following critical relationships to the distance between these pivots:

| | |
|---|---|
| Distance between pivots of first swinging member and intermediate swinging member | $a$ |
| Length of link connecting first swinging member to intermediate swinging member | $1.206a$ |
| Distance from the end of this link which is attached to first swinging member to pivot of this swinging member | $1.801a$ |
| Distance from other end of this link to pivot of intermediate swinging member | $2.373a$ | the length of the second link and the distances from its ends to the pivots of the two swinging members which it connects bear the following critical relationships to the distance between these pivots:

| | |
|---|---|
| Distance between pivots of intermediate swinging member and third swinging member | $b$ |
| Length of link connecting intermediate swinging member to third swinging member | $1.080b$ |
| Distance from the end of this link which is attached to intermediate swinging member to pivot of this swinging member | $1.801b$ |
| Distance from other end of this link to pivot of third swinging member | $2.247b$ | and the angle between a line connecting the pivots of the first and intermediate swinging members and a line connecting the pivots of the intermediate and third swinging members is equal to 142° 34′ plus the angle between lines connecting the pivot of the intermediate swinging member with the ends of the two links which are attached to this swinging member, so that, when the first swinging member moves over a range of 79° 55′ from the position in which it makes an angle of 37° 43′ to a line connecting the pivots of the first and intermediate members, the movements of the third swinging member closely approximate the logarithms of the movements of the first swinging member measured from a zero line at an angle of 36° 05′ 06″ to said line.

*Species of Figs. 2 and 6*

5. A mechanism for use in computing apparatus consisting of a support, three swinging members pivoted on the support on three pivot points equally spaced along a straight line, the intermediate swinging member having branches separated by an angle of substantially 37° 26′, a link connecting the first swinging member with one branch of the intermediate swinging member, and a link connecting the other branch of the intermediate swinging member with the third swinging member, in which the lengths of the links and the distances from their ends to the pivots of the swinging members which they connect bear such relationships to the distance separating the pivot points of the support that the angular distance of the third swinging member from a fixed point closely approximates the logarithm of the angular distance of the first member from a given zero point over a substantial range of movement, and means for limiting the operation of the mechanism to this range of movement.

6. A mechanism for use in computing apparatus consisting of a support, three swinging members pivoted on the support on three pivot points equally spaced along a straight line, a link connecting the first swinging member with the intermediate swinging member, and a link connecting the intermediate swinging member with the third swinging member in which the lengths of the links and the distances from their ends to the pivots of the swinging members bear the following critical relations to the distance separating the pivot points of the support:

Length of link connecting first swinging member to intermediate swinging member _______________________ 1.21±0.05
Distance from the end of this link which is attached to the first swinging member to pivot of this swinging member_______________________ 1.80±0.07
Distance from other end of this link to pivot of intermediate swinging member _______________________ 2.37±0.09
Length of link connecting intermediate swinging member to third swinging member_______________________ 1.08±0.04
Distance from the end of this link which is attached to intermediate swinging member to pivot of this swinging member_______________ 1.80±0.07
Distance from other end of this link to pivot of third swinging member__ 2.25±0.09 and the angle between lines connecting the pivot of the intermediate swinging member with the ends of the two links which are attached to this swinging member is equal to 37° 26'±10'.

7. A mechanism for use in computing apparatus consisting of a support, three swinging members pivoted on the support on three pivot points equally spaced along a straight line, a link connecting the first swinging member with the intermediate swinging member, and a link connecting the intermediate swinging member with the third swinging member, in which the lengths of the links and the distances from their ends to the pivots of the swinging members bear substantially the following critical relations to the distance separating the pivot points of the support:

Length of link connecting first swinging member to intermediate swinging member _________________________________ 1.206
Distance from the end of this link which is attached to the first swinging member to pivot of this swinging member________ 1.801
Distance from other end of this link to pivot of intermediate swinging member_______ 2.373
Length of link connecting intermediate swinging member to third swinging member _________________________________ 1.080
Distance from the end of this link which is attached to intermediate swinging member to pivot of this swinging member _________________________________ 1.801
Distance from other end of this link to pivot of third swinging member__________ 2.247 and the angle between lines connecting the pivot of the intermediate swinging member with the ends of the two links which are attached to this swinging member is substantially equal to 37° 26', so that, when the first swinging member moves over a range of 79° 55' from the position in which it makes an angle of 37° 43' to the straight line on which the pivots of the three swinging members are located, the movements of the third swinging member closely approximate the logarithms of the movements of the first swinging member measured from a zero line at an angle of 36° 05' 06" to said line.

*Species of Figs. 3 and 4*

8. A mechanism for use in computing apparatus consisting of a support, three arms pivoted on the support on pivot points located on a broken line whose parts make an angle of 142° 34' at the pivot of the intermediate arm, and links connecting a point of the intermediate arm to the first and third arms, in which the dimensions of the parts of the mechanism bear such relationship that the angular distance of the third arm from a fixed point closely approximates the logarithm of the angular distance of the first arm from a given zero point over a substantial range of movement, and means for limiting the operation of the mechanism to this range of movement.

9. A mechanism for use in computing apparatus consisting of a support, three arms pivoted on the support, a line connecting the pivots of the intermediate and third arms being at an angle of 142° 34'±10' to a line connecting the pivots of the first and intermediate arms, two lines pivotably connected to the intermediate arm at the same point and having their other ends connected respectively to the first and the third arm, in which the dimensions of the parts of the mechanism bear the following critical relationships to the distance between the pivots of the first and intermediate arms:

Length of link connecting first arm to intermediate arm_________________1.21±0.05
Distance from the end of this link which is attached to the first arm to pivot of this arm___________________ 1.80±0.07
Length of intermediate arm___________ 2.37±0.09
Distance between pivot of intermediate arm and pivot of third arm_________ 1.32±0.06
Length of link connecting intermediate arm with third arm________________ 1.42±0.05
Distance from the end of this link which is attached to third arm to pivot of this arm___________________ 2.96±0.12

10. A mechanism for use in computing apparatus consisting of a support, three arms pivoted on the support, a line connecting the pivots of the intermediate and third arms being at an angle of 142° 34' to a line connecting the pivots of the first and intermediate arms, two links each having one end pivotably connected to the intermediate arm at the same point and having their other ends connected respectively to the first and the third arms, in which the dimensions of the parts of the mechanism bear substantially the following critical relationships to the distance between the pivots of the first and intermediate arms:

| | |
|---|---|
| Length of link connecting first arm to intermediate arm | 1.206 |
| Distance from the end of this link which is attached to the first arm to pivot of this arm | 1.801 |
| Length of intermediate arm | 2.373 |
| Distance between pivot of intermediate arm and pivot of third arm | 1.317 |
| Length of link connecting intermediate arm with third arm | 1.423 |
| Distance from the end of this link which is attached to third arm to pivot of this arm | 2.960 | so that, when the first arm moves over a range of 79° 55' from the position in which it makes an angle of 37° 43' to a line connecting the pivots of the first and intermediate arms, the movements of the third arm closely approximate the logarithms of the movements of the first arm measured from a zero line at an angle of 36° 05' 06" to said line.

*Species of Fig. 5*

11. A mechanism for use in computing apparatus consisting of a support, two arms pivoted on the support at a common pivot point, a bell crank lever pivoted on the support and having two branches at an angle of 217° 26' to each other, and links connecting the arms to the branches of the bell crank lever, in which the lengths of the links, the arms and the branches bear such relationships to the distance between the two pivots on the support that the angular distance of the second arm from a fixed point closely approximates the logarithm of the angular distance of the first arm from a given zero point over a substantial range of movement, and means for limiting the operation of the mechanism to this range of movement.

12. A mechanism for use in computing apparatus consisting of a support, two arms pivoted on the support at a common pivot point, a bell crank lever pivoted on the support and having two branches at an angle of 217° 26' to each other, and links connecting the arms to the branches of the bell crank lever, in which the dimensions of parts of the mechanism bear the following critical relationships to the distance between the two pivots on the support:

| | |
|---|---|
| Length of link connecting first arm with bell crank lever | 1.21±0.05 |
| Distance from the end of this link which is attached to the first arm to common pivot of the two arms | 1.80±0.07 |
| Distance from other end of this link to pivot of bell crank lever | 2.37±0.09 |
| Length of link connecting bell crank lever with second arm | 1.08±0.04 |
| Distance from the end of this link which is attached to bell crank lever to pivot of bell crank lever | 1.80±0.07 |
| Distance from other end of this link to common pivot of the two arms | 2.25±0.09 |

13. A mechanism for use in computing apparatus consisting of a support, two arms pivoted on the support at a common pivot point, a bell crank lever pivoted on the support and having two branches at an angle of 217° 26' to each other, and links connecting the arms to the branches of the bell crank lever, in which the dimensions of parts of the mechanism bear substantially the following critical relationships to the distance between the two pivots on the support:

| | |
|---|---|
| Length of link connecting first arm with bell crank lever | 1.206 |
| Distance from the end of this link which is attached to the first arm to common pivot of the two arms | 1.801 |
| Distance from other end of this link to pivot of bell crank lever | 2.373 |
| Length of link connecting bell crank lever with second arm | 1.080 |
| Distance from the end of this link which is attached to bell crank lever to pivot of bell crank lever | 1.801 |
| Distance from other end of this link to common pivot of the two arms | 2.247 | so that, when the first arm moves over a range of 79° 55' from the position in which it makes an angle of 37° 43' to a line connecting the two pivots on the support, the movements of the second arm closely approximate the logarithms of the movements of the first arm measured from a zero line at an angle of 36° 05' 06" to said line.

ANTONIN SVOBODA.